(12) United States Patent
Park (10) Patent No.: US 12,073,365 B2
(45) Date of Patent: Aug. 27, 2024

(54) METHOD AND APPARATUS FOR PROVIDING CALENDAR SERVICE

(71) Applicant: KAKAO CORP., Jeju-si (KR)

(72) Inventor: Jae Young Park, Seongnam-si (KR)

(73) Assignee: KAKAO CORP., Jeju-si (KR)

( * ) Notice: Subject to any disclaimer, the term of this patent is extended or adjusted under 35 U.S.C. 154(b) by 101 days.

(21) Appl. No.: 17/118,623

(22) Filed: Dec. 11, 2020

(65) Prior Publication Data

US 2021/0182797 A1 Jun. 17, 2021

(30) Foreign Application Priority Data

Dec. 16, 2019 (KR) .................. 10-2019-0167798

(51) Int. Cl.
*G06Q 10/109* (2023.01)
*G06F 16/2458* (2019.01)
*G06F 16/28* (2019.01)
*G06F 18/2433* (2023.01)

(52) U.S. Cl.
CPC ....... *G06Q 10/109* (2013.01); *G06F 16/2477* (2019.01); *G06F 16/284* (2019.01); *G06F 18/2433* (2023.01)

(58) Field of Classification Search
CPC ....... G06F 16/2465; G06N 3/08; G06N 7/005
See application file for complete search history.

(56) References Cited

U.S. PATENT DOCUMENTS

| 7,716,022 | B1 * | 5/2010 | Park ................. G06Q 30/0201 703/22 |
| 2015/0205691 | A1 * | 7/2015 | Seto ................. G06F 11/3452 702/182 |
| 2019/0228353 | A1 * | 7/2019 | Gefen ................. G06Q 10/067 |
| 2019/0370143 | A1 * | 12/2019 | Salunke .............. G06F 11/3495 |
| 2020/0151199 | A1 * | 5/2020 | Nakamura ............ G06F 16/285 |
| 2020/0380354 | A1 * | 12/2020 | Zhao ..................... G06N 3/044 |

FOREIGN PATENT DOCUMENTS

| JP | 2007-87354 A | 4/2007 |
| JP | 2018-10373 A | 1/2018 |

OTHER PUBLICATIONS

Japanese Office Action for JP Application No. 2020-208488 mailed on Jan. 4, 2022.

* cited by examiner

*Primary Examiner* — Kuen S Lu
(74) *Attorney, Agent, or Firm* — CANTOR COLBURN LLP (57) ABSTRACT

A method of providing a calendar service includes obtaining time-series data, determining whether the time-series data correspond to an outlier, obtaining, based on the determination that the time-series data correspond to an outlier, non-time-series data linked to the time-series data corresponding to the outlier, and displaying at least one of the non-time-series data and the time-series data corresponding to the outlier on a calendar page.

15 Claims, 10 Drawing Sheets

| Type | Domain | Calendar | Description |
|---|---|---|---|
| Non-time-series calendar (Event schedule) | Event | News event | Calendar of record worthy news issues registered by news editor |
| | | Portal event | Main issues of portal service (service reorganization, main news events, etc.) |
| | | Push notification | Calendar in which "push notification" history is automatically registered Include push notifications for many, such as "breaking news" |
| Time-series calendar (Indicator schedule) | Portal | Portal main indicator | Service main indicator on portal main page |
| | | Search main indicator | Number of searches made on portal |
| | Media | News section | Main indicator on news web page of media |
| | | Entertainment section | Main indicator on entertainment web page of media |
| | | Sports section | Main indicator on sports web page of media |
| | Sales indicator | Media | Sales figures for ads displayed on media |
| | | Portal | Sales figures of ads displayed on portal |

MAY (Unit: ten thousand)

| 1 | 2 | 3 | 4 | 5 | 6 | 7 |
|---|---|---|---|---|---|---|
| PV:80 | | | | | PV:189 | PV:67 |
| PV:82 | | | | | PV:196 | PV:63 |
| 8 | 9 | 10 | 11 | 12 | 13 | 14 |
| PV:82 | PV:185 | PV:172 | PV:160 | PV:150 | PV:154 | PV:61 |
| PV:87 | PV:182 | PV:171 | PV:190▲ | PV:163 | PV:178 | PV:65 |
| 15 | 16 | 17 | 18 | 19 | 20 | 21 |
| PV:76 | PV:187 | PV:167 | PV:169 | PV:178 | | |
| PV:81 | PV:181 | PV:187 | PV:165 | PV:176 | | |

Indicate outlier on schedule (▲)

MAY (Unit: ten thousand)

| 1 | 2 | 3 | 4 | 5 | 6 | 7 |
|---|---|---|---|---|---|---|
| PV:80 | | | | | PV:189 | PV:67 |
| PV:82 | | | | | PV:196 | PV:63 |
| 8 | 9 | 10 | 11 | 12 | 13 | 14 |
| PV:82 | PV:185 | PV:172 | PV:160 | PV:1_ | PV:154 | PV:61 |
| PV:87 | PV:182 | PV:171 | PV:190 ▲ | PV:1_ | PV:178 | PV:65 |
| 15 | 16 | 17 | 18 | | | 21 |
| PV:80 | PV:180 | PV:170 | PV:169 | PV:180 | | |

Display related event information in response to selection of details view

535 — OOO Summit / PaekSang Arts Awards

| WED 31 | THU AUG. 1 | FRI 2 | SAT 3 |
|---|---|---|---|
| News DDC : 2861 | News DCC : 2800 | [Breaking news] President OOO | News DCC : 2970 |
| News DDC : 422 | News DCU : 417 | [Breaking news] Japan's Economic | News DCU : 436 |
| | | News DCC : 3836 (▲153%) | |
| | | News DCC : 517 (▲124%) | |

(Unit: ten thousand)

|  | SUN<br>SEP. 1 | MON<br>2 | TUE<br>③ | WED<br>4 | THU<br>5 |
|---|---|---|---|---|---|
|  | #ENTPV : 60<br>#ENTUV : 25<br>#ENTDCC : 30<br>#ENTDCU : 12 | #ENTPV : 61<br>#ENTUV : 24<br>#ENTDCC : 31<br>#ENTDCU : 11 |  |  | (Unit: ten thousand) |

METHOD AND APPARATUS FOR PROVIDING CALENDAR SERVICE

CROSS-REFERENCE TO RELATED APPLICATION(S)

This application claims the benefit of Korean Patent Application No. 10-2019-0167798, filed on Dec. 16, 2019, in the Korean Intellectual Property Office, the disclosure of which is incorporated herein by reference.

BACKGROUND

1. Field of the Invention

One or more example embodiments relate to a method and apparatus for providing a calendar service.

2. Description of the Related Art

Companies utilize various business intelligence (BI) tools to make decisions. One of the main functions of BI tools is to visualize data. Even the same data may provide different types of insights to users according to the visualization method. Further, in business, it is common to represent various indicators as time-series data on a time basis. The time-series data are affected by events and accidents occurring inside or outside a company, for example, official announcements in the stock market or announcements of favorable or unfavorable news. However, it is not easy for a user to check every day whether such time-series data are abnormal. In addition, it is not easy for the user to see various events related to the time-series data at a single glance.

SUMMARY

According to an aspect, there is provided a method of providing a calendar service, the method including obtaining time-series data, determining whether the time-series data correspond to an outlier, obtaining, based on the determination that the time-series data correspond to an outlier, non-time-series data linked to the time-series data corresponding to the outlier, and displaying at least one of the non-time-series data and the time-series data corresponding to the outlier on a calendar page.

The determining may include determining whether the time-series data correspond to an outlier based on at least one of a domain type of the time-series data and an indicator type of the time-series data.

The determining may include determining whether the time-series data correspond to an outlier using a statistical value of the time-series data.

The determining of whether the time-series data correspond to an outlier using a statistical value of the time-series data may include at least one of determining whether the time-series data correspond to an outlier using a moving average of data for a predetermined period based on the time-series data, and determining whether the time-series data correspond to an outlier using a statistical value of remaining data after removing periodicity and tendency from the time-series data.

The obtaining of the non-time-series data may include at least one of searching for non-time-series data linked to a date of the time-series data, searching for non-time-series data linked to the time-series data in an event domain related to the time-series data, and obtaining non-time-series data linked to the time-series data based on whether a preset condition corresponding to the time-series data is satisfied.

The event domain related to the time-series data may be predefined, and a relational database between the time-series data and an event calendar corresponding to the event domain may be built in advance.

The method may further include registering at least one of the non-time-series data and the time-series data corresponding to the outlier as a schedule on the calendar page.

The calendar page may include at least one of an indicator schedule and an event schedule, and the displaying may include at least one of displaying the time-series data corresponding to the outlier as an indicator schedule on the calendar page, and displaying the non-time-series data as an event schedule on the calendar page.

The displaying may include displaying, on the calendar page, whether the time-series data correspond to an outlier.

The displaying may include displaying at least one of whether the time-series data correspond to an outlier and the non-time-series data linked to the time-series data corresponding to the outlier as a push notification on the calendar page.

The method may further include displaying the time-series data corresponding to the outlier to be distinguished from other time-series data.

The method may further include determining whether a user selection for details view is input into a region of a date, on the calendar page, corresponding to the time-series data corresponding to the outlier, and displaying, in response to the determination that a user selection for details view is input, the non-time-series data in the region of the date.

The method may include displaying the time-series data as an indicator schedule on the calendar page.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, example embodiments will be described in detail with reference to the accompanying drawings. In the drawings, like reference numerals are used for like elements.

Various modifications may be made to the examples. Here, the examples are not construed as limited to the disclosure and should be understood to include all changes, equivalents, and replacements within the idea and the technical scope of the disclosure.

The terminology used herein is for the purpose of describing particular examples only and is not to be limiting of the examples. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the examples with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure.

Figure 1:
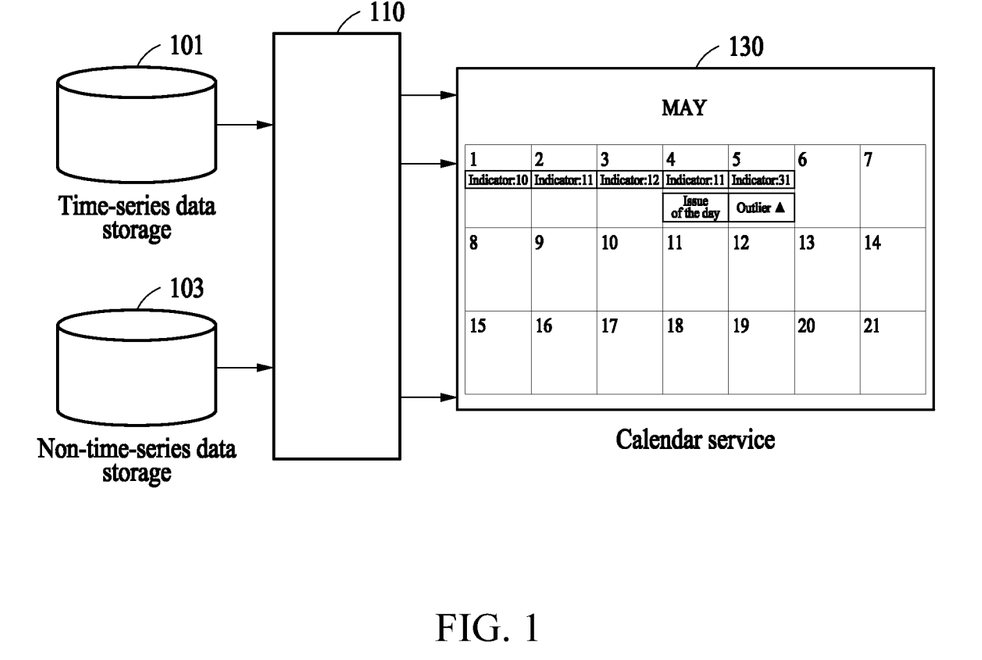
FIG. 1 illustrates a system configuration for providing a calendar service according to an example embodiment.

FIG. 1 illustrates a system configuration for providing a calendar service according to an example embodiment. Referring to FIG. 1, a time-series data storage 101, a non-time-series data storage 103, a device 110, and a calendar service screen 130 are shown.

The time-series data storage 101 may store a variety of time-series data. The time-series data storage 101 may store a variety of time-series data on a predetermined time basis such as a daily basis or a weekly basis. Here, the "time-series data" may be data obtained by interpreting indicators on a time basis according to the passage of time, such as a daily basis, a weekly basis, a monthly basis, or a seasonal basis, that is, numerical indicators.

The time-series data may have a periodic pattern according to a business domain. The time-series data may have a periodicity that a predetermined pattern is repeated on a time basis such as, for example, a daily basis, a weekly basis, a monthly basis, or a seasonal basis. In addition, the time-series data may have a tendency in the overall flow, for example, increasing, decreasing, maintained, and the like. The time-series data may include, for example, numerical indicators of a visit indicator, a content indicator, a mobile TOP indicator, a search indicator, a news portal indicator, a news tab indicator, a sales indicator, a profit of a company, a profit and loss of the company, a share price increment, a share price decrement, a share price increase rate, and a share price decrease rate. However, examples are not limited thereto. The numerical indicators may be expressed by various indicator terms such as, for example, page view (PV), unique visitor (UV), daily active user (DAU), query number, daily content click (DCC), and a daily content click user (DCU).

PV may correspond to the number of visits to one service page. For example, when one user visits a service page A ten times, PV of the service page A may be expressed as 10 PV. UV may correspond to the number of unique visitors who visit the service page A. For example, even when one user visits the service page A ten times, UV for the service page A may be expressed as 1 UV. DAU may have the same meaning as UV.

Query number may correspond to the number of search queries in one search domain. Query number may also be referred to as "query count". For example, when one search is performed through a search box of a portal D, query number may be expressed as one query. A query may include, for example, a user query and a guided query. The user query may correspond to a search performed in a search box as intended by a user. The guided query may correspond to a search performed as guided by a service, for example, in the form of reaching a search result by selecting a link, rather than a search performed directly by a user through a search box.

DCC may correspond to the number of clicks of content on a service page during a day. In addition, DCU may correspond to the number of unique users clicking content on a service page during a day.

The non-time-series data storage 103 may store non-numerical data irrelevant to the passage of time such as, for example, news events occurring when main issues are recorded by news editors of a portal, such as internal and external events of a company or country, TOP events of a portal occurring when issues of an app of the portal and the main page (Top) of the portal are recorded by managers of the portal, business events, holiday events, and other events. The non-numerical data stored in the non-time-series data storage 103 are not time-series data, and may be various types of data such as characters, symbols, pictures, and images, other than numerical values. The non-numerical data may be stored based on, for example, dates on which the non-numerical data are generated and/or dates on which the non-numerical data are registered in the non-time-series data storage 103. The non-time-series data storage 103 may also be referred to as a "non-numerical data storage".

The device 110 may correspond to a device on which an application for a calendar service is installed. The device 110 may include, for example, a display, a memory, a processor, and a communication interface. The device 110 may be, for example, a server, or a user terminal such as a personal computer (PC), a laptop, a netbook, a tablet, a smart phone, or a wearable device. Here, the server may be, for example, a single server computer or a system similar thereto, or one or more server banks, or a plurality of servers arranged in other arrangements. The server may be placed in a single facility or may be a server "cloud" distributed among many different geographic locations.

The calendar service screen 130 is a screen of the device 110 that provides a calendar service, and may provide various date-specific information such as schedules, anniversaries, and to-dos, along with a calendar.

A method of providing a calendar service by the device 110 is as follows. For example, the device 110 may obtain the daily-basis time-series data (for example, the numerical indicators) from the time-series data storage 101, and obtain the non-time-series data generated or registered on the dates of the time-series data from the non-time-series data storage 103.

The device 110 may register the daily-basis time-series data as schedules (for example, indicator schedules) in the calendar. In addition, the device 110 may register the nontime-series data generated or registered on the dates of the time-series data as separate schedules (for example, event schedules) on the corresponding dates. The device 110 may display the time-series data and/or the non-time-series data registered as the schedules on a calendar page. When providing the calendar service, the device 110 may display the previously registered separate schedules together with the time-series data on the calendar page, display only the time-series data, or display only the separate schedules.

In this case, the device 110 may determine whether the daily-basis time-series data correspond to an outlier, and display whether the time-series data are an outlier together with the schedules on the calendar. In response to the determination that the time-series data correspond to an outlier, the device 110 may automatically guide, recommend, notify, or display non-time-series data associated with the time-series data. In some examples, the device 110 may monitor time-series data related to predetermined non-time-series data and provide a result of monitoring to a user.

The device 110 may improve the accessibility and intuitiveness of the user for daily-basis data through visualization that displays time-series data and non-time-series data related to the time-series data together through the calendar service screen 130.

Hereinafter, a method of providing a calendar service by the device 110 will be described in detail with reference to the following drawings.

Figure 2:
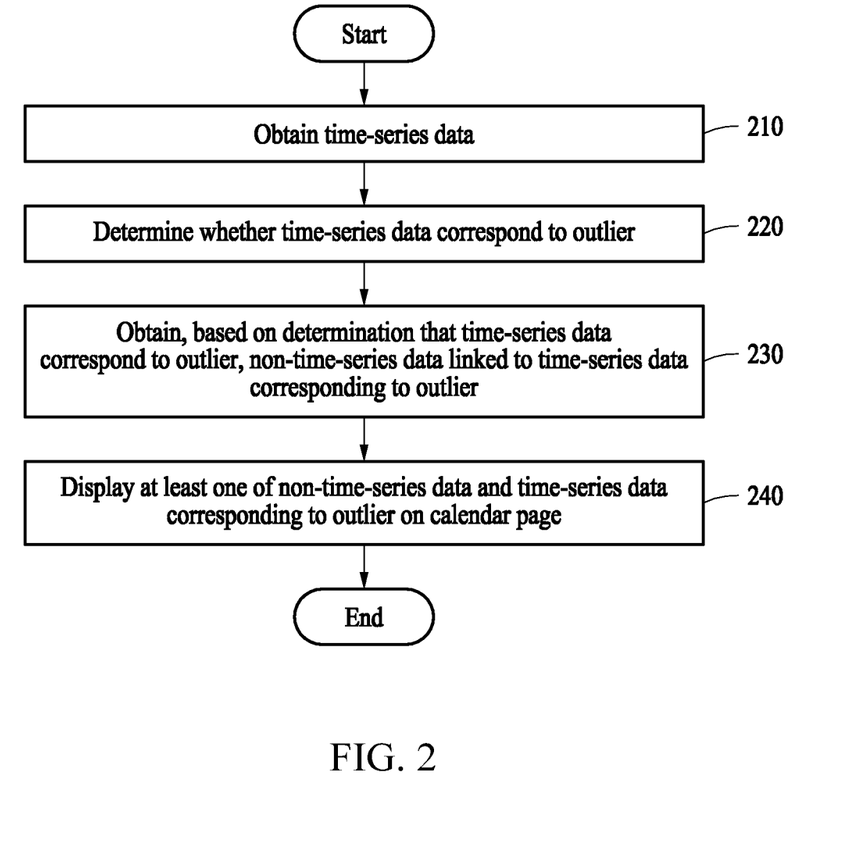
FIG. 2 is a flowchart illustrating a method of providing a calendar service according to an example embodiment.

FIG. 2 is a flowchart illustrating a method of providing a calendar service according to an example embodiment. Referring to FIG. 2, in operation 210, a device obtains time-series data. The device may obtain the time-series data on a daily basis or a predetermined time basis from a storage or database where the time-series data are stored in advance.

In operation 220, the device determines whether the time-series data correspond to an outlier. Here, the "outlier" may correspond to a value indicating a statistical abnormality when the time-series data show a great difference compared to other time-series data or when the pattern of the time-series data suddenly changes. The device may determine whether the time-series data correspond to an outlier, for example, using a statistical value of the time-series data. The device may determine whether the time-series data correspond to an outlier, for example, using a moving average of data for a predetermined period based on the time-series data. Alternately, the device may determine whether the time-series data correspond to an outlier using a statistical value of remaining data after removing periodicity and tendency from the time-series data. The device may determine whether the time-series data correspond to an outlier through an abnormality detection method of obtaining a distribution free from the influence of the periodicity and tendency corresponding to characteristics of the time-series data, for example, through STL-decomposition, and determining whether the time-series data correspond to an outlier using the distribution.

For example, the device may display indicator changes in transverse data based on the time-series on a calendar, that is, daily-basis time-series data for a week, or display indicator changes in lengthwise data based on the time-series data, that is, weekly-basis time-series data.

The device may determine whether the time-series data correspond to an outlier based on at least one of a domain type of the time-series data and an indicator type of the time-series data. In this case, a threshold used to determine whether the time-series data correspond to an outlier may be set differently, for example, for each domain type and/or for each indicator type. The domain type and the indicator type will be described in detail with reference to FIG. 3 below.

In operation 230, the device obtains, based on the determination that the time-series data correspond to an outlier, non-time-series data linked to the time-series data corresponding to the outlier. Here, the "non-time-series data linked to time-series data" may correspond to non-time-series data generated on the same dates on which the time-series data are generated, non-time-series data registered in a database on the same dates on which the time-series data are generated, and/or non-time-series data relevant to the time-series data. Here, the "non-time-series data relevant to time-series data" may correspond to non-time-series data dealing with the same subject (for example, event, accident, person, ceremony, or the like) as the time-series data although generated on dates different from the dates on which the time-series data are generated. In other words, the "non-time-series data relevant to time-series data" may correspond to non-time-series data that are generated in relation to the same subjects of the time-series data on dates close to the dates on which the time-series data are generated, such as before or after the dates on which the time-series data are generated. For example, if time-series data are generated on May 5, non-time-series data linked to the time-series data may correspond to non-time-series data that are generated or registered in a database on May 5 and/or non-time-series data generated on May 6 or May 7 in relation to the time-series data generated on May 5.

In operation 230, the device may retrieve, for example, non-time-series data linked to the dates of the time-series data. The device may retrieve the non-time-series data linked to the dates of the time-series data from a database provided in advance, such as a non-time-series data storage. Alternatively, the device may search for the non-time-series data linked to the dates of the time-series data through internet search or web crawling.

In operation 230, the device may search for the non-time-series data linked to the time-series data in an event domain related to the time-series data. In this example, the event domain related to the time-series data may be predefined. In addition, a relational database between the time-series data and an event calendar corresponding to the event domain may be built in advance like, for example, (indicator, related calendar), (sports service PV, game schedule calendar), or (news service PV, news event calendar).

Alternately, in operation 230, the device may obtain the non-time-series data linked to the time-series data based on whether a preset condition corresponding to the time-series data is satisfied. For example, it may be assumed that the preset condition corresponding to the time-series data is that the increase rate of the time-series data is at least 5% greater than a threshold, or that the decrease rate of the time-series data is at most −5% less than the threshold. When the increase rate of the time-series data is 7% greater than the threshold, the device may obtain non-time-series data linked to the time-series data. Alternatively, in response to satisfying a condition that the value of an indicator of today increases at least 120% based on a moving average of the past three months in a news domain, the device may obtain non-time-series data linked to the time-series data.

The device may register the non-time-series data together with or separately from the time-series data corresponding to the outlier as a calendar schedule.

In operation 240, the device displays at least one of the non-time-series data obtained in operation 230 and the time-series data corresponding to the outlier on a calendar page. The calendar page may include at least one of an indicator schedule and an event schedule. The device may display, on the calendar page, only the non-time-series data or the time-series data corresponding to the outlier, or the non-time-series data and the time-series data corresponding to the outlier together.

The device may display the time-series data as an indicator schedule on the calendar page, while displaying the non-time-series data as an event schedule on the calendar page. In an example, the device may display the non-time-series data on the calendar page for recommendation to a user, and register the non-time-series data as a schedule on the calendar in response to receiving a selection of the user for the non-time-series data displayed on the calendar page.

Further, the device may display whether the time-series data correspond to an outlier together with the schedule on the calendar page. For example, the device may display whether the time-series data correspond to an outlier through a separate phrase such as "Big issue" or through various symbols such as exclamation marks (!!), a star (★), and a triangle (Δ). Examples of the calendar page will be described in detail with reference to FIGS. 4 to 6 below.

Figure 3:
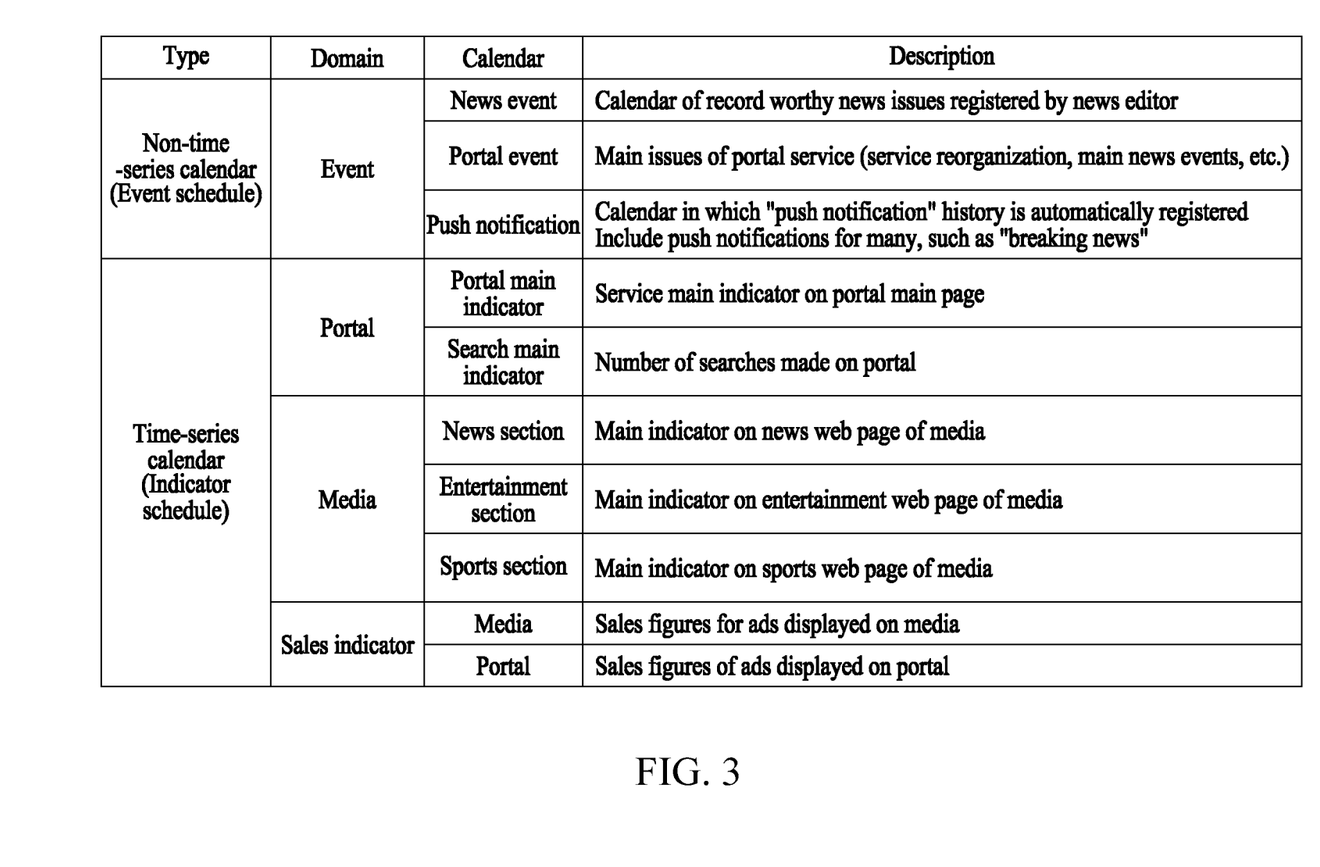
FIG. 3 illustrates domain types and indicator types of data according to an example embodiment.

FIG. 3 illustrates domain types and indicator types of data according to an example embodiment. Referring to FIG. 3, a table showing examples of domain types and indicator types of data is illustrated.

The data may be classified into non-time-series data such as event schedules and time-series data such as indicator schedules. The non-time-series data may include, for example, an event domain. The non-time-series data may include, for example, news events, portal events, push notifications, and the like. The time-series data may include, for example, a portal domain, a media domain, a company index domain such as a sales indicator domain, and a stock domain, but are not limited thereto. In addition, the portal domain may include various types of indicators such as, for example, a portal main indicator and a search main indicator that is identified through the main page of the portal, but is not limited thereto.

The device may use a different method of determining whether the time-series data correspond to an outlier, for example, for each domain type and for each indicator type of the time-series data. For example, when the domain type of the time-series data is a portal domain, and the indicator type thereof is a search main indicator, the device may determine whether the time-series data correspond to an outlier by the abnormality detection method described above. Alternatively, when the domain type of the time-series data is a media type, and the indicator type thereof is a news section indicator, the device may determine whether the time-series data correspond to an outlier using a moving average.

Figure 4A:
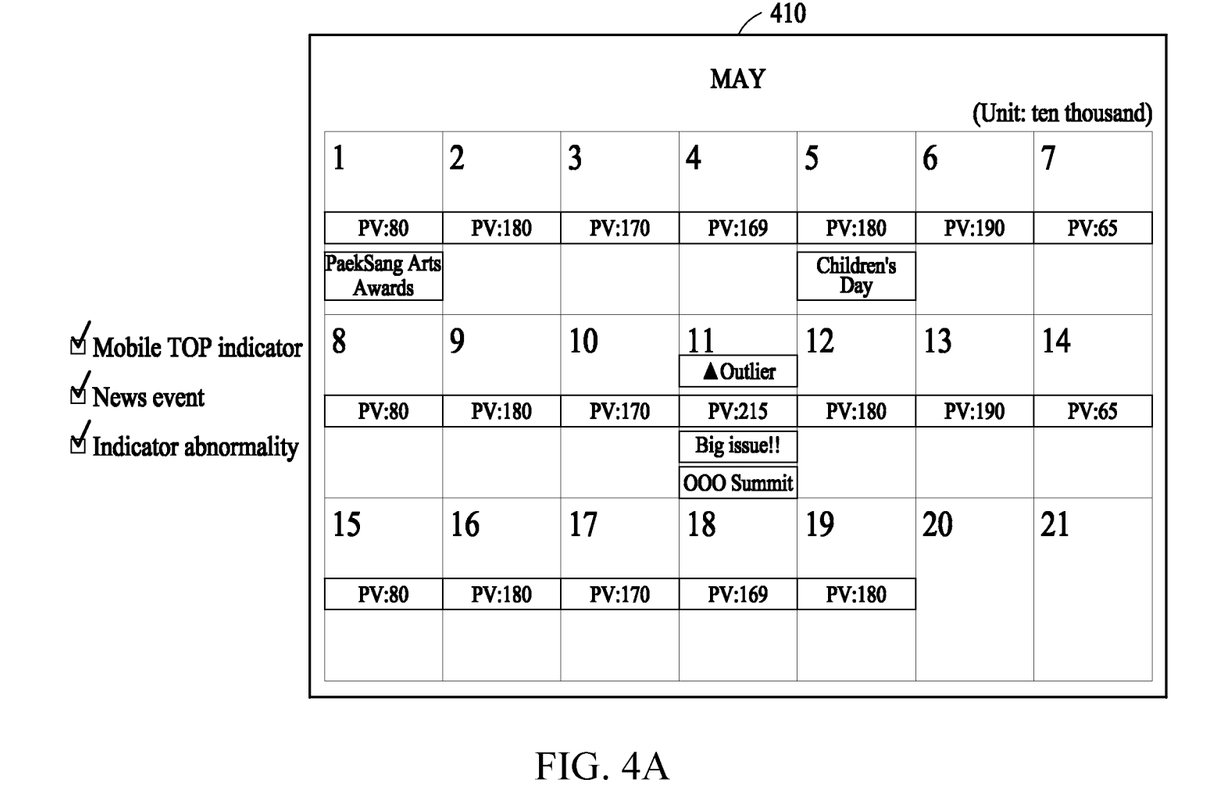
FIGS. 4A and 4B illustrate screens displaying time-series data and non-time-series data on a calendar page according to an example embodiment.
Figure 4B:
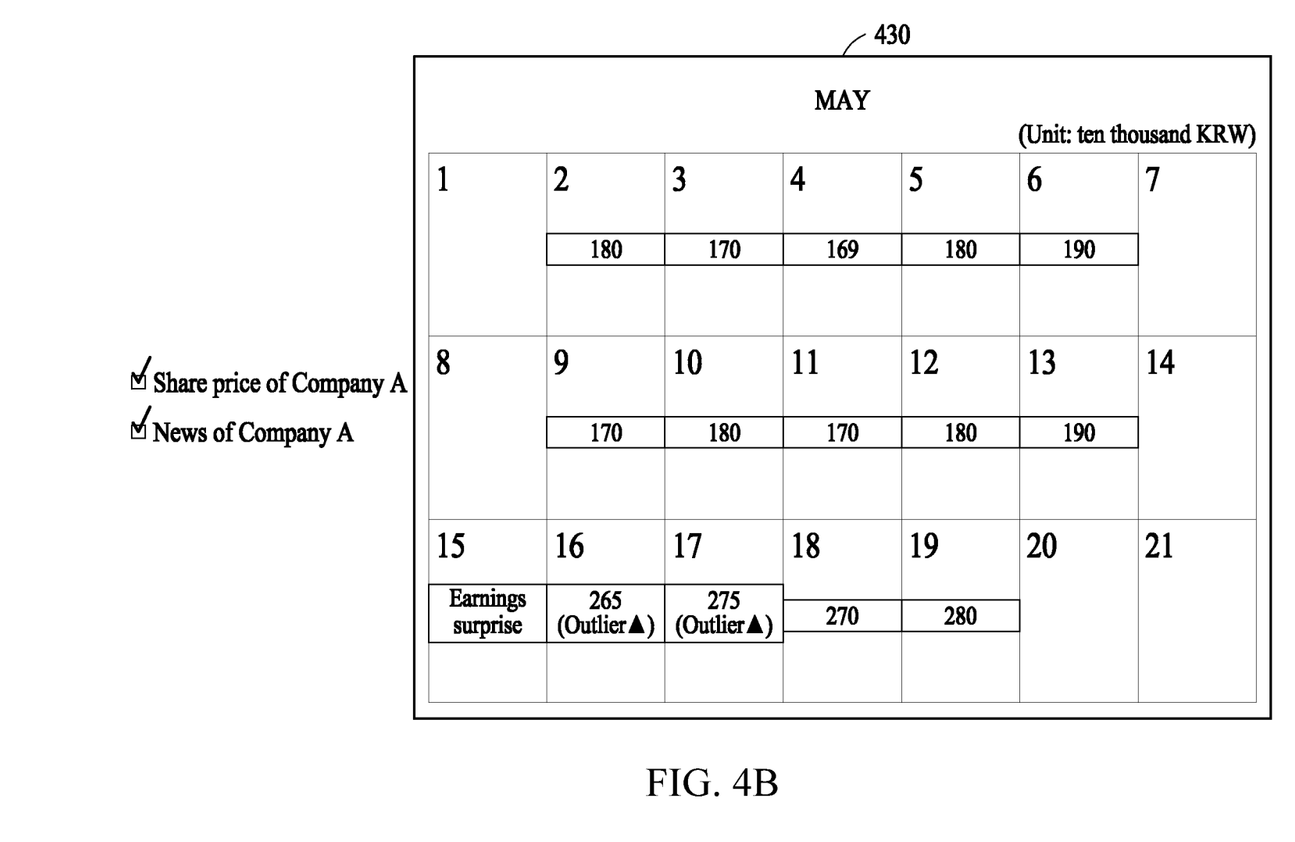

FIGS. 4A and 4B illustrate screens displaying time-series data and non-time-series data on a calendar page according to an example embodiment. Referring to FIGS. 4A and 4B, a screenshot 410 of a calendar page corresponding to a company index domain and a screenshot 430 of a calendar page corresponding to a stock domain are illustrated.

For example, the screenshot 410 shows a calendar displaying mobile TOP indicators corresponding to time-series data and news events corresponding to non-time-series data as schedules. The mobile TOP indicators represent the values of PV for the respective dates of May. In addition, the non-time-series data may represent news events for the respective dates of May. In this case, a user may set the calendar to show the mobile TOP indicators and the news events by directly selecting a button corresponding to the mobile TOP indicators and a button corresponding to the news events displayed on the left side of the screenshot 410. Further, the user may set the calendar to show whether the time-series data correspond to an outlier on the screenshot 410 by selecting an indicator abnormality button displayed on the left side of the screenshot 410. Depending on the example, whether the time-series data correspond to an outlier may be displayed by a user setting or may be automatically displayed in response to the determination that the time-series data correspond to an outlier without a separate user setting.

For example, it may be assumed that time-series data are mobile TOP indicators, and non-time-series data linked to the time-series data are news events. In this case, when displaying mobile TOP indicators for respective dates as indicator schedules on the calendar of May shown in the screenshot 410, the device may display, if there are non-time-series data linked to the mobile TOP indicators, the non-time-series data as event schedules. At this time, it may be assumed that the value of a mobile TOP indicator (pv: 2,150,000) on May 11 is determined to correspond to an outlier. In this case, the device may display "Δ outlier" or "Big issue! !" in a predetermined region of May 11 on the calendar shown in the screenshot 410, thereby displaying the time-series data corresponding to the outlier to be distinguished from other time-series data. Further, the device may display, on the calendar page, a news event ("OOO Summit") corresponding to non-time-series data linked to the time-series data (mobile TOP indicator) dated May 11.

The screenshot 430 shows a calendar page corresponding to the stock domain. The time-series data may include numerical data such as share prices of a company, in addition to numerical indicators such as company indices. For example, it may be assumed that time-series data are share prices of a company A, and non-time-series data linked to the time-series data are news of the company A. The device may record the share prices of the company A for respective dates on which the stock market opens as indicator schedules of May on the calendar, and further register and display the news events of the company A related to the share prices of the company A for the respective dates as the event schedules of May on the calendar. In this example, when a news event occurs relevant to the company A even on a date on which time-series data are not generated, the news event of the company A may be displayed on the calendar page as an event schedule, like "earnings surprise" displayed on May 15.

In addition, if the share prices of the company A on May 16 and May 17 after the earnings surprise of May 15 correspond to outliers that significantly exceed the statistical share price, the phrase and symbol indicating that the share prices of the company A correspond to outliers, like "(Outlier ▲)" may be displayed together as the schedules of May 16 and May 17 on the calendar.

Figure 5A:
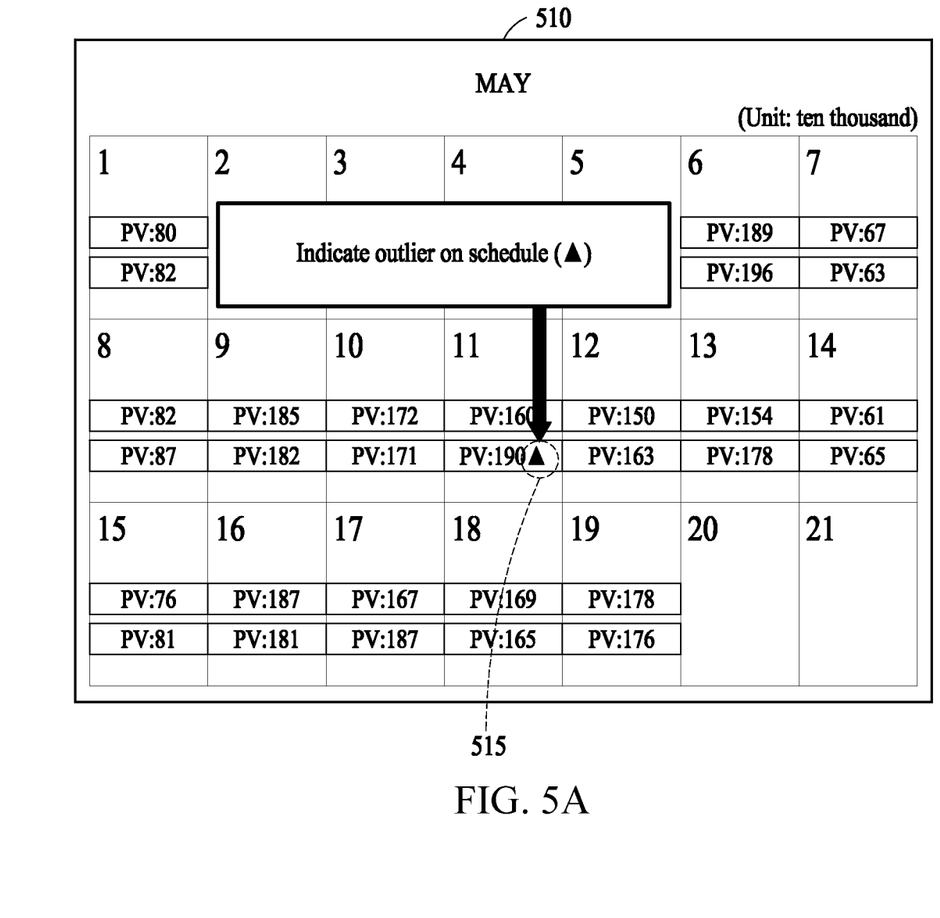
FIGS. 5A and 5B illustrate a method of displaying non-time-series data linked to time-series data corresponding to an outlier according to an example embodiment.
Figure 5B:
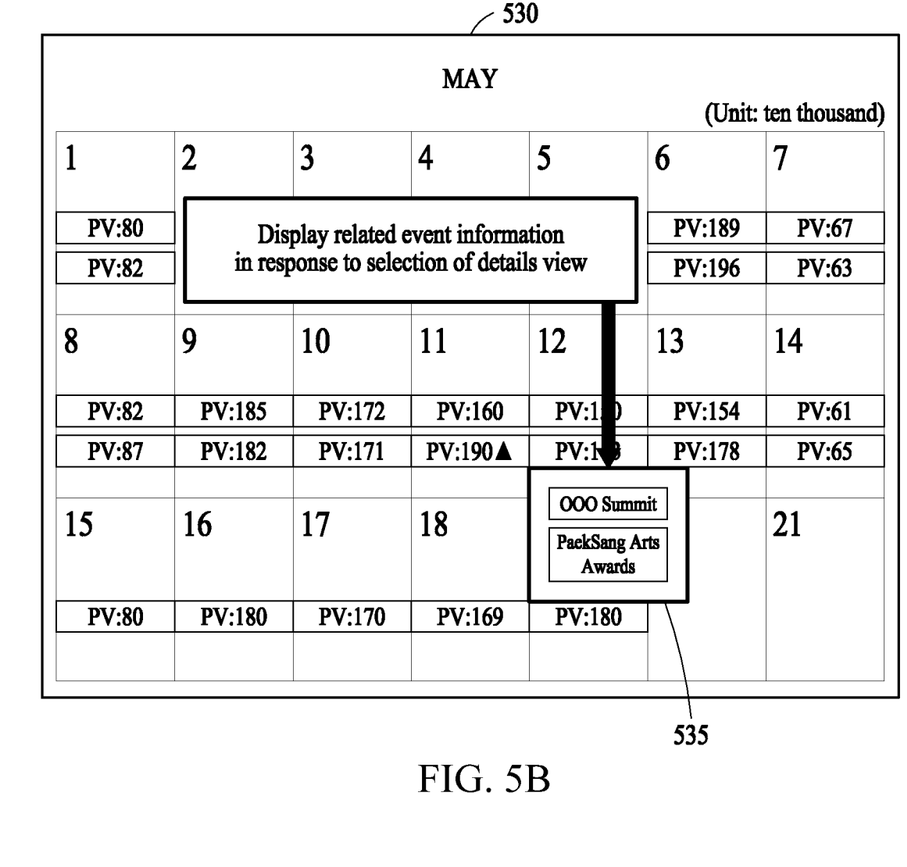

FIGS. 5A and 5B illustrate a method of displaying non-time-series data linked to time-series data corresponding to an outlier according to an example embodiment. Referring to FIGS. 5A and 5B, a screenshot 510 showing whether time-series data correspond to an outlier and a screenshot 530 showing non-time-series data linked to time-series data corresponding to an outlier are illustrated.

As displayed in a predetermined region of May 11 on the calendar of the screenshot 510, the device may display a separate comment or a predetermined symbol such as a triangle (▲) 515 with time-series data corresponding to an outlier, thereby displaying the time-series data corresponding to an outlier to be distinguished from other time-series data.

Alternatively, the device may determine whether a user selection for details view is input into a region of a date, on the calendar page, corresponding to the time-series data corresponding to the outlier, and display, in response to the determination that a user selection for viewing details is input, the non-time-series data in the region of the date.

For example, as shown in the screenshot 530, when a user inputs a user selection for details view into a predetermined region by selecting the region of a predetermined date (for example, a date corresponding to time-series data corresponding to an outlier) on the calendar page, the device may display non-time-series data 535 (for example, relevant information corresponding to May 12, such as "Summit" or "PaekSang Arts Awards") linked to the time-series data of the selected date (for example, May 12). In this example, the device may determine that a region corresponding to a predetermined date (for example, May 19) is selected, by a click event or a mouseover event generated by a user in a predetermined region corresponding to the predetermined date.

Figure 6A:
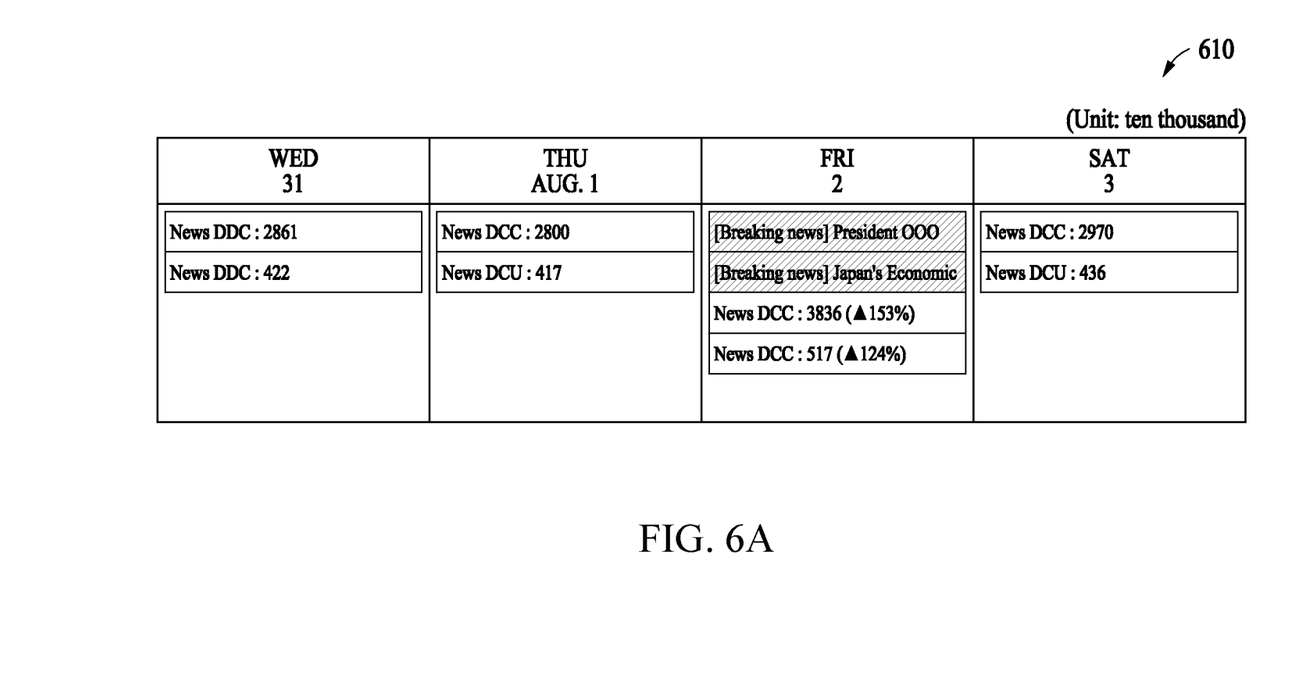
FIGS. 6A and 6B illustrate methods of displaying a calendar page according to example embodiments.
Figure 6B:
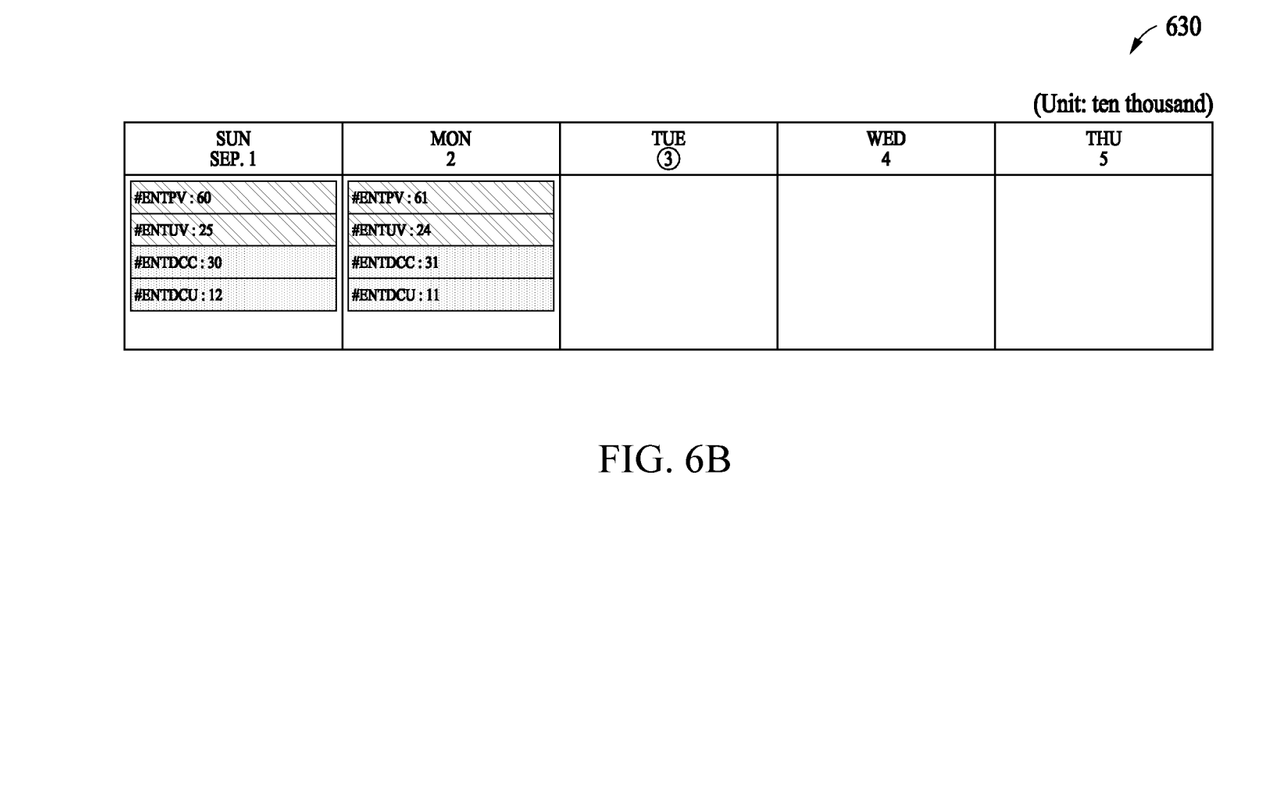

FIGS. 6A and 6B illustrate methods of displaying a calendar page according to example embodiments. Referring to FIGS. 6A and 6B, a screenshot 610 in which a push notification is provided on a calendar page when time-series data correspond to an outlier is illustrated.

A device may display at least one of whether time-series data correspond to an outlier and non-time-series data linked to the time-series data corresponding to the outlier through push notifications on a calendar page. For example, it may be assumed that time-series data of August 2 is an outlier. In this example, the device may display whether the time-series data of August 2 correspond to an outlier by displaying "▼153% compared to the 3-mth average" in a predetermined region of August 2, and in the meantime, display non-time-series data linked to the time-series data of August 2 in the form of a push notification such as "[Breaking News] Japan's economic sanctions against South Korea".

Depending on the example, the device may provide, through the calendar service, time-series data and non-time-series data linked to the time-series data, in various fields such as sports section, entertainment section, spot #tab visit/content consumption, and the like. For example, as shown in a screenshot 630, the device may display a tab PV and/or a UV, which is a visit indicator for an entertainment section, as a cover schedule of the calendar, or display a DCC and a DCU, which are content indicators for the entertainment section, as cover schedules of the calendar.

Figure 7:
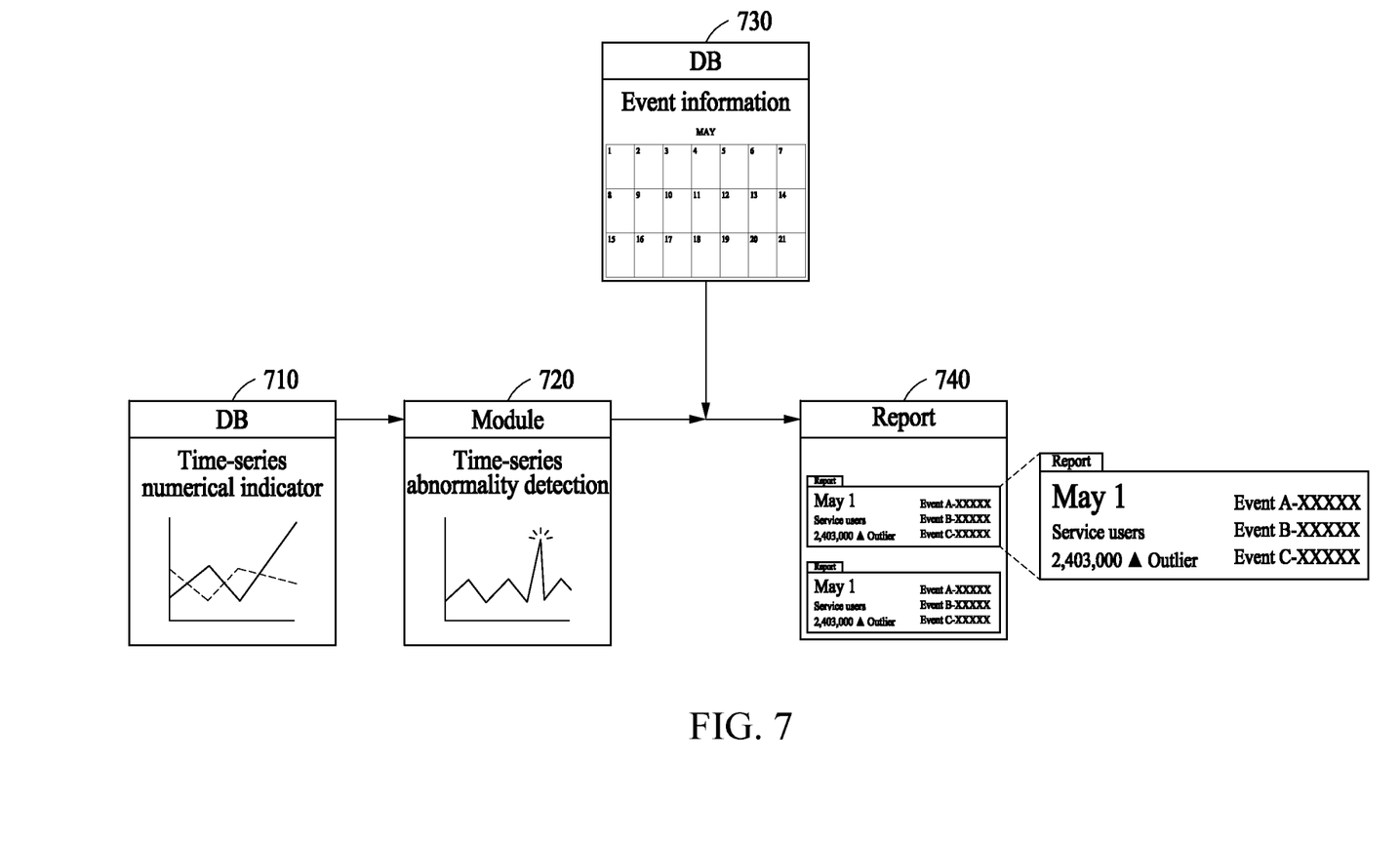
FIG. 7 illustrates a method of providing a calendar service according to an example embodiment.

FIG. 7 illustrates a method of providing a calendar service according to an example embodiment. Referring to FIG. 7, a process of providing a calendar service by automatically searching for a relevant event when a device detects time-series data corresponding to an outlier is illustrated.

In operation 710, the device may obtain a time-series numerical indicator X from a database. In operation 720, the device may detect whether the obtained time-series numerical indicator X is abnormal. Here, whether the time-series numerical indicator X is abnormal may be determined based on a statistical abnormality occurring when the time-series numerical indicator X shows a great difference compared to numerical indicators of other dates or when the pattern of the time-series numerical indicator X suddenly changes when compared to numerical indicators of other dates.

In response to detecting an abnormality, the device may retrieve event information from a database, in operation 730. In operation 730, the device may search for an event Z corresponding to a date on which the time-series numerical indicator X is generated in an event domain Y related to the time-series numerical indicator X in which the abnormality is detected. In this case, the event domain Y related to the time-series numerical indicator X may be predefined. Further, a relationship between the time-series numerical indicator X and the event calendar corresponding to the event domain Y may be built in advance, for example, in the form of a database.

In operation 740, the device may combine whether the time-series numerical indicator X corresponds to an outlier with the event Z and present a report to the user. In this case, the device may combine whether the time-series numerical indicator X corresponds to an outlier with the event Z and present a report to the user by displaying the combination result in a predetermined region corresponding to the date on which the time-series numerical indicator X is generated.

Although not shown in the drawings, the device may include a processor, a memory, and a communication interface. The processor, the memory, and the communication interface may be connected to each other through a communication bus.

The processor may perform the at least one method described with reference to FIGS. 1 to 7 or an algorithm corresponding to the at least one method. The processor may execute a program and control the device. Program codes to be executed by the processor may be stored in the memory.

The units described herein may be implemented using a hardware component, a software component and/or a combination thereof. A processing device may be implemented using one or more general-purpose or special purpose computers, such as, for example, a processor, a controller, a central processing unit (CPU), a graphics processing unit (GPU), an arithmetic logic unit (ALU), a digital signal processor (DSP), a microcomputer, a field-programmable gate array (FPGA), a programmable logic unit (PLU), a microprocessor, an application-specific integrated circuit (ASIC), or any other device capable of responding to and executing instructions in a defined manner.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of providing a calendar service by a server, the method comprising:
   obtaining a type of time series data selected by a user from among a plurality of types of time-series data, the plurality of types of time-series data being matched to a plurality of event domains of non-time-series data;
   obtaining time-series data corresponding to the type selected by the user;
   determining whether the time-series data correspond to an outlier by detecting an abnormality of the time-series data based on the type selected by the user;
   obtaining, based on the determination that the time-series data correspond to an outlier, non-time-series data linked to the time-series data corresponding to the outlier;
   registering the non-time-series data linked to the time-series data corresponding to the outlier on the calendar; and
   communicating with a user terminal for displaying the calendar on the user terminal,
   wherein the obtaining of the non-time-series data comprises
   obtaining a date corresponding to the detected abnormality of the time-series data;
   identifying an event domain, from among the plurality of event domains, based on the type selected by the user; and
   searching for a content corresponding to the date, the content being the non-time-series data linked to the time-series data corresponding to the outlier, in the event domain through internet search or web crawling.

2. The method of claim 1, wherein the determining comprises determining whether the time-series data correspond to an outlier based on at least one of a domain type and an indicator type of the time-series data selected by the user.

3. The method of claim 1, wherein the determining comprises determining whether the time-series data correspond to an outlier using a statistical value of the time-series data.

4. The method of claim 3, wherein the determining of whether the time-series data correspond to an outlier using a statistical value of the time-series data comprises at least one of:
   determining whether the time-series data correspond to an outlier using a moving average of data for a predetermined period based on the time-series data; and
   determining whether the time-series data correspond to an outlier using a statistical value of remaining data after removing periodicity and tendency from the time-series data.

5. The method of claim 1, wherein the event domain related to the time-series data is predefined, and
   a relational database between the time-series data and an event calendar corresponding to the event domain is built in advance.

6. A method of providing a calendar service by a user terminal, the method comprising:
   receiving, from the user, selection of a type of time-series data among a plurality of types of time-series data, the plurality of types of time-series data being matched to a plurality of event domains of non-time-series data;
   receiving, from a server, time-series data corresponding to an outlier and non-time-series data linked to the time-series data corresponding to the outlier; and
   displaying at least one of the non-time-series data and the time-series data corresponding to the outlier on the calendar,
   wherein the server is configured to:
   determine whether the time-series data correspond to the outlier by detecting an abnormality of the time-series data based on the type selected by the user;
   obtain a date corresponding to the detected abnormality of the time-series data;
   identify an event domain, from among the plurality of event domains, based on the type selected by the user; and
   search for a content corresponding to the date, the content being the non-time-series data linked to the time-series data corresponding to the outlier, in the event domain through internet search or web crawling.

7. The method of claim 6, further comprising:
   registering the non-time-series data linked to the time-series data corresponding to the outlier on the calendar,
   wherein the registering comprises at least one of:
   registering the time-series data corresponding to the outlier as an indicator schedule on the calendar; and
   registering the non-time-series data as an event schedule on the calendar.

8. The method of claim 6, wherein the displaying comprises displaying, on the calendar, whether the time-series data correspond to an outlier.

9. The method of claim 6, wherein the displaying comprises displaying at least one of whether the time-series data correspond to an outlier and the non-time-series data linked to the time-series data corresponding to the outlier as a push notification on the calendar.

10. The method of claim 6, further comprising:
    displaying the time-series data corresponding to the outlier to be distinguished from other time-series data.

11. The method of claim 6, further comprising:
    determining whether a user selection for details view is input into a region of a date, on the calendar, corresponding to the time-series data corresponding to the outlier; and
    displaying, in response to the determination that a user selection for details view is input, the non-time-series data in the region of the date.

12. The method of claim 6, further comprising:
    receiving, from the server, time-series data not corresponding to the outlier; and
    displaying the time-series data not corresponding to the outlier on the calendar.

13. The method of claim 6, wherein the calendar comprises at least one of an indicator schedule and an event schedule.

14. A non-transitory computer-readable storage medium storing instructions that, when executed by a processor, cause the processor to perform the method of claim 6.

15. A non-transitory computer-readable storage medium storing instructions that, when executed by a processor, cause the processor to perform a method comprising:
    obtaining a type of time-series data selected by a user from among a plurality of types of time-series data, the plurality of types of time-series data being matched to a plurality of event domains of non-time-series data;

obtaining time-series data corresponding to the type selected by the user;

determining whether the time-series data correspond to an outlier by detecting an abnormality of the time-series data based on the type selected by the user;

obtaining, based on the determination that the time-series data correspond to an outlier, non-time-series data linked to the time-series data corresponding to the outlier;

registering the non-time-series data linked to the time-series data corresponding to the outlier on the calendar; and communicating with a user terminal for displaying the calendar on the user terminal, wherein the obtaining of the non-time-series data comprises obtaining a date corresponding to the detected abnormality of the time-series data;

identifying an event domain, from among the plurality of event domains, based on the type selected by the user;

searching for a content corresponding to the date, the content being the non-time-series data linked to the time-series data corresponding to the outlier, in the event domain through internet search or web crawling.

* * * * *